J. HAMELBACK.
Combined Cultivator and Corn Planter.
No. 202,026. Patented April 2, 1878.
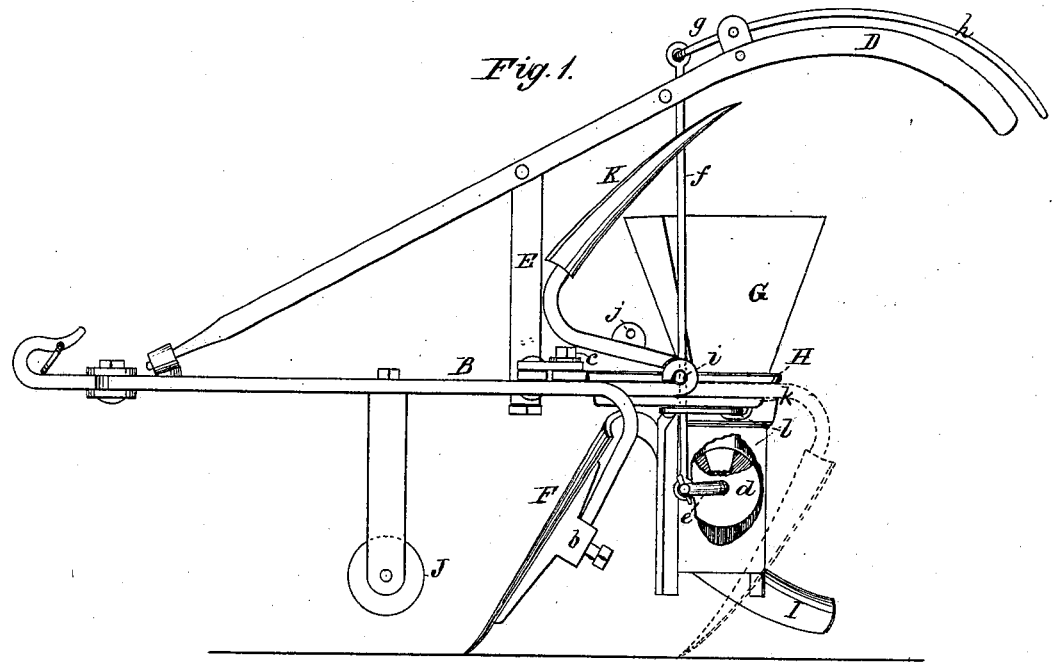
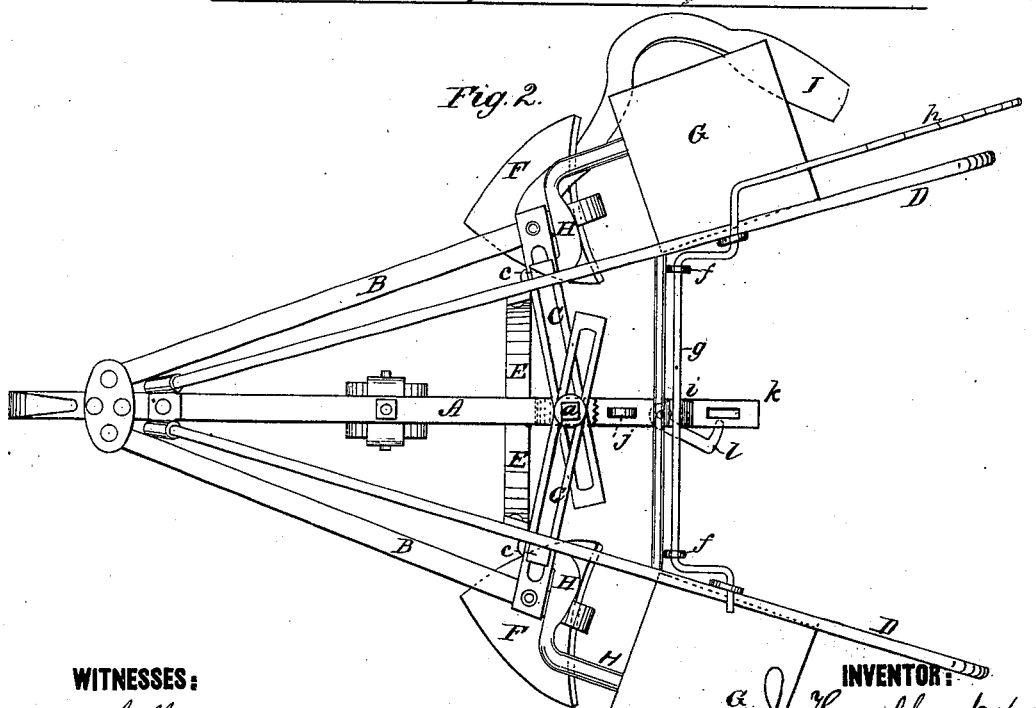

UNITED STATES PATENT OFFICE.

JACOB HAMELBACK, OF HOPEWELL, OHIO, ASSIGNOR TO HIMSELF, WILLIAM HAMELBACK, AND DUNCAN HAMELBACK, OF SAME PLACE.

IMPROVEMENT IN COMBINED CULTIVATOR AND CORN-PLANTER.

Specification forming part of Letters Patent No. 202,026, dated April 2, 1878; application filed January 30, 1878.

*To all whom it may concern:*

Be it known that I, JACOB HAMELBACK, of Hopewell, in the county of Muskingum and State of Ohio, have invented a new and Improved Combined Cultivator and Corn-Planter; and I do hereby declare that the following is a full, clear, and exact description of the same, reference being had to the accompanying drawing, forming part of this specification, in which—

Figure 1 is a side elevation with the near seed-box removed and the farther one broken out to show the internal arrangement. Fig. 2 is a plan view with both seed-boxes in place.

The object of my invention is to so combine a corn-planter and a cultivator as to cause the shovels of the cultivator to operate as furrow-openers for the seed-boxes, or to be used independently of the seed-boxes simply as a cultivator.

The invention is an improvement upon that form of cultivator in which the side bars are pivoted to ears upon the front end of the center beam, and are connected near their rear ends with said center beam by slotted bars and screw-bolts, which permit the shovels of the side bars to be adjusted to rows of varying width.

The improvements consist in the peculiar arrangement of seed-boxes, which are made detachable, and are applied to the rear slotted bar of the cultivator by supporting-arms in connection with connecting-rods and operating crank shaft and lever.

The invention also further consists in the peculiar construction and arrangement of an opener, as hereinafter fully described.

In the drawing, A represents the center beam, and B B the side bars, of a cultivator of the kind to which my invention is applied. Said side bars are pivoted at their front ends to ears or plates attached to the center beam, and near their rear ends are adjustably connected with the center beam by slotted bars C, which, in connection with the central bolt $a$, allow the side bars to be adjusted on their forward pivots, to increase or diminish the width of the cultivator.

D are the handles, arranged in sockets near the front end of the cultivator, and supported near the slotted bars C upon inclined braces or standards E. The rear extremities of the side bars are bent down and connected with the side shovels F by means of the socket-pieces $b$, the ends of said side bars being inserted into the sockets of pieces $b$, and there secured by a binding-screw.

G are the seed-boxes, which are supported upon arms H immediately in the rear of the side shovels F. Said boxes and arms are made detachable, for the purpose hereinafter described, and in securing their removability their said supporting-arms are bent twice at right angles in a horizontal plane, flattened, perforated, and then fastened, by means of a bolt, $c$, to the slotted bars C.

In constructing the seed-boxes they are formed with an upwardly-flared hopper and a lower case, in which is contained a disk or roller, $d$, which has cavities forming seed-cups upon its periphery, and which cavities, as the disks or rollers are oscillated, alternately move beneath the hopper and become filled, and then, by a partial revolution, turn the contents of the cavities into the discharge-spout below, so that they drop thence into the furrow made by the shovel. To give the necessary oscillating motion to the rollers in the seed-boxes, said rollers are provided with cranks $e$, which extend through the side of the seed-box, and are connected with the lower ends of rods $f$. These latter are in turn loosely connected with a crank-shaft, $g$, journaled in bearings upon the handles, and one end of the crank-shaft is bent so as to form a lever, $h$, which may be moved by hand to oscillate the seed-rollers and effect the dropping at will.

After the seeds are dropped they are covered by a coverer, I. This coverer consists of a blade whose shank is bent in a zigzag form, flattened at its extremity, and fastened by a nut upon the same bolt $c$ that secures the supporting-arm of the seed-box to the slotted bar C.

When the device is to be used as a seed-planter only the two shovels F are employed, and these act in the capacity of furrow-openers for the seed-boxes; a roller, J, in a swiveling frame beneath the center beam serving to steady the device and prevent the shovels from going too deep. When, however, the device is to be used as a cultivator, the bolt c is loosened and the seed-boxes, with their arms H and the coverers I, are removed. A central rear shovel, K, is then let down upon its hinge i, and a staple or perforated lug, j, attached to the shank of the shovel, is made to pass through a slot in a plate or hasp, k, extending rearwardly from the under side of the center beam, and a hook, l, is then fastened in the perforated lug upon the opposite side of the plate or hasp k, so that the shovel is held rigidly and firmly down to its duty. In this condition it will be seen that the device forms a complete and easily-adjusted cultivator.

Having thus described my invention, what I claim as new is—

1. The supporting-arms H, carrying the seed-boxes, combined with and fastened to the slotted bar C of an adjustable cultivator, substantially as described.

2. The supporting-arm H, carrying the seed-boxes, and the coverer I, combined with the slotted bar C of an adjustable cultivator, and secured thereto by a single bolt, c, substantially as and for the purpose described.

3. The combination, with the adjustable cultivator, having slotted bars C, of the supporting-arms H, seed-box G, having a roller with seed-cups, the connecting-rod f, crank-shaft g, and hand-lever h, substantially as and for the purpose described.

JACOB HAMELBACK.

Witnesses:
AMBROSE BENJAMIN,
ROSS ELDON NORMAN.